US012761069B2

(12) United States Patent
Dueweke

(10) Patent No.: US 12,761,069 B2
(45) Date of Patent: Oct. 13, 2026

(54) AUTOMATED WEIGHING SYSTEMS

(71) Applicant: Sesh Technologies Manufacturing Inc., Spokane, WA (US)

(72) Inventor: Jason Dueweke, Deer Park, WA (US)

(73) Assignee: Sesh Technologies Manufacturing Inc., Spokane, WA (US)

( * ) Notice: Subject to any disclaimer, the term of this patent is extended or adjusted under 35 U.S.C. 154(b) by 323 days.

(21) Appl. No.: 18/489,728

(22) Filed: Oct. 18, 2023

(65) Prior Publication Data

US 2024/0044694 A1 Feb. 8, 2024

Related U.S. Application Data

(63) Continuation-in-part of application No. 17/462,515, filed on Aug. 31, 2021, now Pat. No. 11,697,519.

(60) Provisional application No. 63/483,071, filed on Feb. 3, 2023.

(51) Int. Cl.
*G01G 21/22* (2006.01)
*G01G 23/18* (2006.01)

(52) U.S. Cl.
CPC ............. *G01G 21/22* (2013.01); *G01G 23/18* (2013.01)

(58) Field of Classification Search
CPC ........ G01G 15/00; G01G 21/22; G01G 23/18; G01G 23/3721
See application file for complete search history.

(56) References Cited

U.S. PATENT DOCUMENTS

| | | | | |
|---|---|---|---|---|
| 4,884,602 | A | 12/1989 | Yamamoto et al. | |
| 4,976,326 | A * | 12/1990 | McConnell | G01G 11/00 177/1 |
| 5,230,207 | A | 7/1993 | Hartzell et al. | |
| 5,594,184 | A * | 1/1997 | Schroder | A24C 5/3424 177/1 |
| 6,396,002 | B1 * | 5/2002 | Hove | B65B 19/32 141/83 |
| 11,382,351 | B1 * | 7/2022 | Abehasera | A24C 5/392 |
| 11,523,632 | B2 * | 12/2022 | Giddings | A24C 5/54 |
| 11,751,600 | B2 * | 9/2023 | Ahn | A24C 1/28 131/74 |
| 2016/0120212 | A1 | 5/2016 | Heidtmann | |
| 2019/0320709 | A1 | 10/2019 | Kaufmann et al. | |
| 2020/0054066 | A1 | 2/2020 | Kaufmann et al. | |
| 2021/0030054 | A1 * | 2/2021 | Godwin | A24C 5/02 |
| 2021/0161216 | A1 * | 6/2021 | Slurink | B65B 1/46 |
| 2021/0221547 | A1 * | 7/2021 | Zaniboni | A24F 40/42 |
| 2021/0392944 | A1 * | 12/2021 | Kustal | A24C 5/54 |

(Continued)

FOREIGN PATENT DOCUMENTS

WO WO2019140237 7/2019

OTHER PUBLICATIONS

Office Action for U.S. Appl. No. 17/462,515, mailed on Dec. 22, 2022, Dueweke, "Automated Closing Systems", 17 Pages.

(Continued)

*Primary Examiner* — Natalie Huls
(74) *Attorney, Agent, or Firm* — Lee & Hayes, P.C.

(57) ABSTRACT

Systems and methods for an automated paper cone weighing machine are disclosed. A paper cone weighing machine may comprise a plurality of load cells arranged in a row, each load cell for weighing a material contained in a respective conically shaped paper roll of the plurality of conically shaped paper rolls.

20 Claims, 12 Drawing Sheets

(56) References Cited

U.S. PATENT DOCUMENTS

| | | | | |
|---|---|---|---|---|
| 2022/0175018 | A1* | 6/2022 | Tuttle | A24C 5/02 |
| 2022/0175020 | A1* | 6/2022 | Holderman | A24C 5/06 |
| 2022/0211095 | A1* | 7/2022 | Sullivan | A24C 5/399 |
| 2022/0267035 | A1* | 8/2022 | Garthaffner | B65B 5/08 |
| 2023/0063615 | A1 | 3/2023 | Dueweke | |
| 2023/0382587 | A1 | 11/2023 | Dueweke | |
| 2024/0044694 | A1 | 2/2024 | Dueweke | |
| 2024/0246709 | A1* | 7/2024 | Draghetti | B65B 43/56 |

OTHER PUBLICATIONS

Office Action for U.S. Appl. No. 18/323,274, mailed on Dec. 21, 2023, Duewek.

* cited by examiner

AUTOMATED WEIGHING SYSTEMS

CROSS REFERENCE TO RELATED APPLICATIONS

This application claims priority as a continuation-in-part to U.S. patent application Ser. No. 17/462,515, filed Aug. 31, 2021, and claims priority to U.S. Provisional Patent Application No. 63/483,071, filed Feb. 3, 2023, the entire contents of each of which are incorporated herein in by reference.

BACKGROUND

Machines may be used to automate manufacturing processes. Machines may be designed to produce a manufactured product comprising delicate materials that are required to be combined in a specific manner. Described herein are improvements in technology and solutions to technical problems that may be used to, among other things, enhance the experience for users producing a manufactured product.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
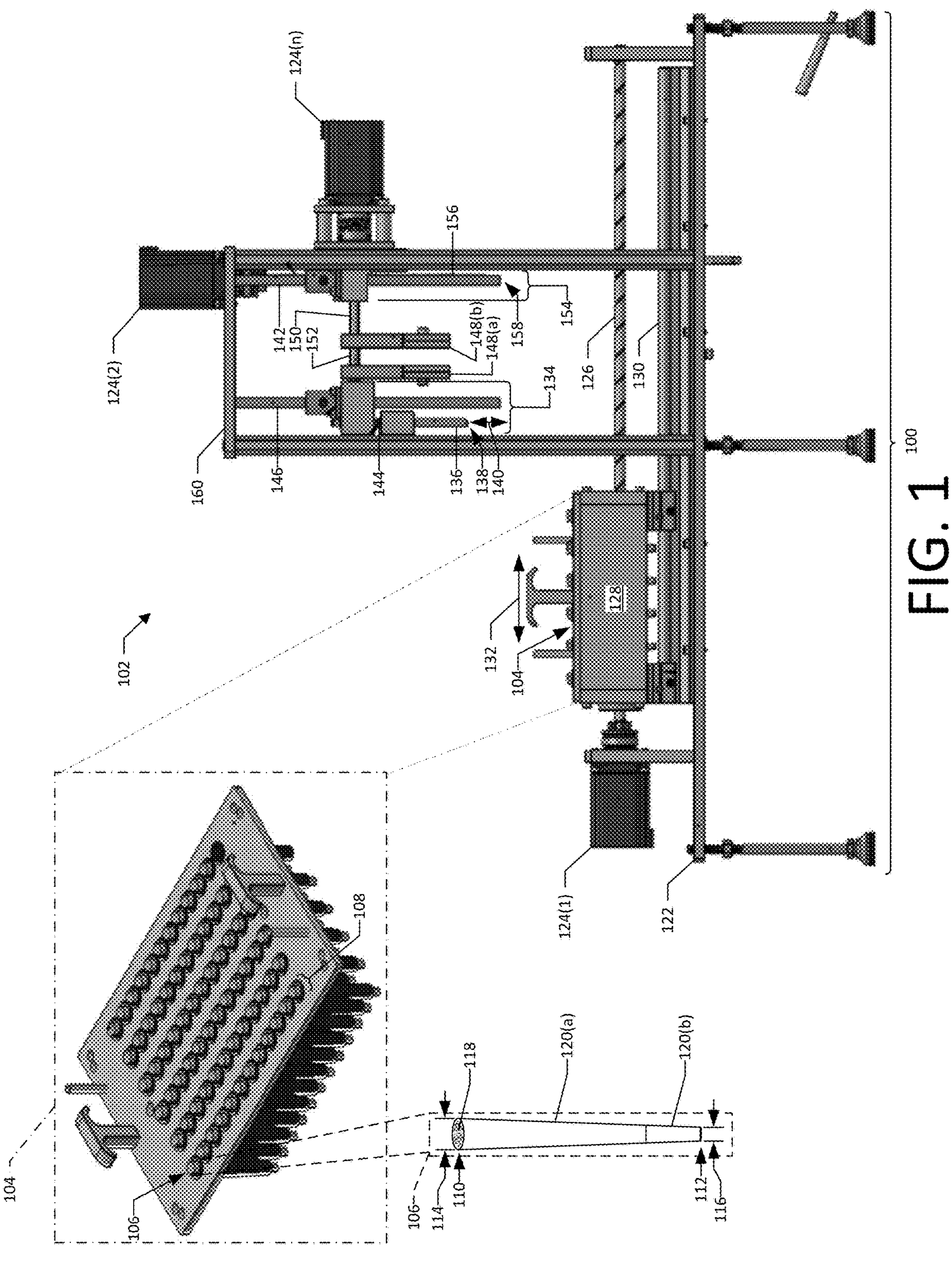
FIG. 1 illustrates a side view of an example automated paper roll closing machine according to an embodiment of the instant application.

This disclosure is directed to an automated paper roll weighing machine (hereinafter, "the weighing machine") and systems for use thereof. Take for example, an environment having processed agricultural material (hereinafter, "the material") where one or more users reside. Such users may desire to package a desired quantity of the material by themselves for repurpose use. Such desired quantity of the material may be disposed in packaging such as paper rolls having established standardized shapes, sizes, and/or components for repurpose use. However, such a desired quantity may be time consuming and/or difficult to determine by hand (e.g., manually). A weighing machine may be configured with various components for weighing a paper roll formed of a paper-like material having a shape, size, and/or components for repurpose use. In some examples, the shape of the paper roll may be substantially conical. In some examples, the paper-like material may be comprised of at least one of refined white paper, unrefined brown paper, recycled paper, hemp paper, tobacco leaf, palm leaf, and/or anything containing substantially similar qualities. In some examples, the paper roll may include a paper-like support material disposed therein. In some examples, the support material may be substantially cylindrical and/or conical in shape. In some examples, the support material may have a more favorable rigidity than the paper-like material used to shape the paper roll, such that the support material provides substantial support for at least a portion of the paper roll. In some examples, the support material may be comprised of at least one of refined white paper, unrefined brown paper, recycled paper, hemp paper, palm leaf, and/or anything containing substantially similar qualities. Additionally, or alternatively, the support material may be configured to obstruct the processed agricultural material while allowing for air to pass therethrough.

The components of the weighing machine may be arranged in various combinations and/or orientations. The weighing machine may be configured with a variety of closing and/or transporting mechanism configurations including various components. Example weighing mechanism configurations may also include a tray shuttle configured to transport a plurality of paper rolls between the closing mechanisms. Example weighing mechanism configurations may also include a tray configured to removeably receive the plurality of paper rolls in rows. Example weighing machine configurations may be configured to weigh the material contained in each paper roll and determine a weight of the material contained in each paper roll.

The weighing machine may be configured such that the one or more components are fixed to a support frame. In some examples, the support frame may be configured to arrange the components in a particular manner and/or may provide a fixed position for the components such that the components may be utilized together with precision. The weighing machine may also be configured such that a user may utilize one or more displays presenting one or more graphical user interfaces (GUIs) to control the operation task, calibration, and/or settings and/or display raw values of each load cell for calibration processes there within. The weighing machine may also be configured such that a user may utilize one or more buttons. The weighing machine may be configured such that the paper rolls are routed from a closing machine and arranged in a storage or housing that may be separate from the weighing machine.

The tray may be arranged in a number of ways. For example, the tray may be removeably received by the tray shuttle. Additionally, or alternatively, the tray may be fixed in the tray shuttle. The tray shuttle may be arranged in a number of ways. For example, the tray shuttle may be coupled to a rail system. Additionally, or alternatively, the tray shuttle may be displaceable in a first direction along the rail system. Additionally, or alternatively, the rail system may be fixed to a top surface of the support frame.

The one or more displays may have at least one processor and at least one memory. Additionally, or alternatively, the one or more displays may be communicably coupled to one or more external computing devices. The memory may have instructions stored thereon that cause the processor to perform one or more actions, such as, for example, presenting a GUI on the one or more displays. The GUI may be configured to accept input from a user to cause the weighing machine to perform an action, such as, for example, weigh material disposed in a paper roll, calibrate portions of the weighing machine, set portions of the weighing machine, and/or display values (e.g., readable information for a user to visualize what is happening with the material disposed in the paper rolls, raw values of each load cell for calibration processes, and/or cause any of the components described herein to perform an associated desired operation). Additionally, or alternatively, the GUI may be configured to accept input from a user to control the operation task, speed, and/or percentage of available power from a motor, and/or choose from various closing techniques there within or specify settings to create new closing techniques. The GUI may also be configured to power on and power off the weighing machine. Other actions the weighing machine may be able to perform are, for example, safety settings, on/off timer, and timed speed changes to form different paper cone weighing techniques. Take for example, an environment where a user desires to produce a number of paper rolls containing the material for repurpose use and/or sell as a prepackaged product that meets the industry standard.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a side view 100 of an example automated paper roll closing machine (hereinafter, "the closing machine") 102. The closing machine 102 may include a tray 104 for removeably receiving a plurality of conically shaped paper rolls 106, in a row 108. While FIG. 1 illustrates the tray 104 includes six (6) rows of openings removeably receiving a plurality of conically shaped paper rolls, the tray 104 may have any number of rows of openings for removeably receiving a plurality of conically shaped paper rolls. Further, while FIG. 1 illustrates the tray 104 includes twelve (12) openings in each row removeably receiving a plurality of conically shaped paper rolls, each row may have any number of openings for removeably receiving a plurality of conically shaped paper rolls. Each conically shaped paper roll 106 having a top 110 opposite a bottom 112. The top 110 having a diameter 114 greater than a diameter 116 of the bottom 112. Each conically shaped paper roll 106 containing a processed agricultural material (hereinafter, "the material") 118. While FIG. 1 illustrates the shape of the conically shaped paper roll 106 may be substantially conical, other shapes are contemplated. For example, the shape of the paper rolls may be substantially cylindrical, right circular cylindrical, oblique circular cylindrical, right prism cylindrical, right rectangular cylindrical, etc. In some examples, each conically shaped paper roll 106 may be formed of a paper-like material 120(*a*). The paper-like material 120(*a*) may be comprised of at least one of refined white paper, unrefined brown paper, recycled paper, hemp paper, palm leaf, and/or anything containing substantially similar qualities. In some examples, each conically shaped paper roll 106 may include a support material 120(*b*) disposed therein. In some examples, the support material 120(*b*) may be substantially cylindrical and/or conical in shape. In some examples, the support material 120(*b*) may have a more favorable rigidity than the paper-like material 120(*a*) used to shape the conically shaped paper roll 106, such that the support material 120(*b*) provides substantial support for at least a portion of the conically shaped paper roll 106. In some examples, the support material 120(*b*) may be comprised of at least one of refined white paper, unrefined brown paper, recycled paper, hemp paper, palm leaf, and/or anything containing substantially similar qualities. Additionally, or alternatively, the support material 120(*b*) may be configured to obstruct the material while allowing for air to pass therethrough.

The closing machine 102 may include a support frame 122. The support frame 122 may provide support for the one or more components/implements of the closing machine 102. The support frame 122 may be configured such that the components may be arranged in various manners, such that the closing machine 102 may utilize various closing techniques, such as, for example, multiple closing operations executing simultaneously, closing of paper cones having various sizes, and/or closing operations executing at various speeds. In some examples, the support frame 122 may be connected across the entirety of the closing machine 102. Additionally, or alternatively, each individual component of the closing machine 102 may have a standalone support frame. The support frame 122 may be configured to support one or more motors 124(1), 124(2), and 124(*n*) for providing operational power to one or more components of the closing machine 102. In some examples, the one or more motors 124(1)-124(*n*) may be coupled to an individual component. Additionally, or alternatively, the closing machine 102 may utilize one motor for providing operational power to the components included therein. The one or more motors 124(1)-124(*n*) may be configured such that a user may specify a speed, such as, for example, a percentage of available power from the motor at which the motor will operate. In some examples, the motor may be configured to operate at any value from 0 to 100 percent of the available power from the motor, where 0 percent may be the lowest available power from the motor and 100 percent may be the highest available power from the motor. The motor may be configured such that it provides operational power to a number of components of the closing machine at the speed specified by the user. In an embodiment, the one or more motors 124(1)-124(N) comprise stepper motors. The stepper motors being based on counts or steps made by the stepper motors. A user may program, for example, 1 to 100,000 steps in an input component (e.g., keyboard, display, mouse, HMI (Human Machine Interface) (e.g., HMI 707 discussed below in more detail)) to control a speed of the stepper motors.

These steps are relative to Hertz that are sent to a motor drive. The motor drive then takes that signal and sends it to the motor and uses it to control the motor speed.

The closing machine 102 may include a leadscrew 126 that may be arranged in a number of ways. For example, the leadscrew 126 may be secured to the support frame 122. Additionally, or alternatively, the leadscrew 126 may have a standalone support frame. In some examples, the leadscrew 126 may be configured to include a first end and a second end being opposite the first end. The leadscrew 126 may further be configured to travel in at least a first direction of travel and a second direction of travel. Additionally, or alternatively, the leadscrew 126 may be configured to rotate about its longitudinal axis. The leadscrew 126 may be actuated by the one or more motors 124(1)-**124(*n*). For example, the leadscrew 126 may be caused to rotate about its longitudinal axis by motor 124(1)**.

The closing machine 102 may include a tray shuttle 128. The tray shuttle 128 may removeably receive the tray 104. For example, a user may place the tray 104 into the tray shuttle 128 and/or a user may remove the tray 104 from the tray shuttle 128. For example, a user may place the tray 104 into the tray shuttle 128 subsequent to the tray 104 being loaded with the plurality of conically shaped paper rolls 106 and/or a user may remove the tray 104 from the tray shuttle 128 subsequent to the plurality of conically shaped paper rolls 106 being ejected from the tray 104. The tray shuttle 128 may be coupled to a rail system 130. The rail system 130 may be arranged in a number of ways. For example, the rail system 130 may be secured to the support frame 122. Additionally, or alternatively, the rail system 130 may have a standalone support frame. The tray shuttle 128 may be displaceable in a first direction 132 along the rail system 130. For example, motor 124(1) may cause the leadscrew 126 to rotate about its longitudinal axis to cause the tray shuttle 128 to be displaced in the first direction 132 along the rail system 130.

The closing machine 102 may include a tamping system 134 that may be arranged in a number of ways. For example, the tamping system 134 may be arranged above the tray shuttle 128. Additionally, or alternatively, the tamping system 134 may be secured to the support frame 122. Additionally, or alternatively, the tamping system 134 may have a standalone support frame. The tamping system 134 may include a plurality of tamping rods 136 arranged in a row 138. The plurality of tamping rods 136 being displaceable in a second direction 140 perpendicular to the first direction 132 for compacting the material 118 contained in each of the conically shaped paper rolls 106 down toward the bottom 112 of each respective conically shaped paper roll 106. For example, the tray shuttle 128 may be displaced in the first direction 132 such that the row 108 of the plurality of conically shaped paper rolls 106 are positioned directly below the plurality of tamping rods 136 such that when the plurality of tamping rods 136 are displaced in the second direction 140, at least a portion of the plurality of tamping rods 136 contacts the material 118 contained in the plurality of conically shaped paper rolls 106 to tamp the material 118 down toward the bottom 112 of each respective conically shaped paper roll 106.

The closing machine 102 may include a leadscrew 142 that may be arranged in a number of ways. For example, the leadscrew 142 may be secured to the support frame 122. Additionally, or alternatively, the leadscrew 142 may have a standalone support frame. In some examples, the leadscrew 142 may be configured to include a first end and a second end being opposite the first end. The leadscrew 142 may further be configured to travel in at least a first direction of travel and a second direction of travel. Additionally, or alternatively, the leadscrew 142 may be configured to rotate about its longitudinal axis. The leadscrew 142 may be actuated by the one or more motors 124(1)-**124(*n*). For example, the leadscrew 142 may be caused to rotate about its longitudinal axis by motor 124(2). Motor 124(2) may cause the lead screw 142 to rotate about its longitudinal axis to cause the plurality of tamping rods 136 to be displaced in the second direction 140. The tamping system 134 may include one or more pressure springs 144 arranged with the tamping rods 136. The one or more pressure springs 144 to prevent the plurality of tamping rods 136 from over pressuring the material 118 contained in the plurality of conically shaped paper rolls 106. For example, the one or more pressure springs 144 may be arranged between the leadscrew 142 and the plurality of tamping rods 136 to dampen the force applied by the leadscrew 142 to the plurality of tamping rods 136. The tamping system 134 may include one or more guide rods 146. The one or more guide rods 146 to guide the plurality of tamping rods 136 in the second direction 140 when the leadscrew 142 causes the plurality of tamping rods 136 to be displaced in the second direction 140**.

The closing machine 102 may include a pair of plates **148(*a*) and 148(*b*) that may be arranged in a number of ways. For example, the pair of plates 148(*a*) and 148(*b*) may be arranged above the tray shuttle 128 and adjacent to the plurality of tamping rods 136. Additionally, or alternatively, the pair of plates 148(*a*) and 148(*b*) may be secured to the support frame 122. Additionally, or alternatively, the pair of plates 148(*a*) and 148(*b*) may have a standalone support frame. The pair of plates 148(*a*) and 148(*b*) for pressing on the top 110 of each conically shaped paper roll 106 to flatten the top 110 of each conically shaped paper roll 106 into a flap. For example, subsequent to the plurality of tamping rods 136 tamping the material 118 down toward the bottom 112 of each respective conically shaped paper roll 106, the tray shuttle 128 may be displaced in the first direction 132 such that the row 108 of the plurality of conically shaped paper rolls 106 are positioned directly below the pair of plates 148(*a*) and 148(*b*) where the pair of plates 148(*a*) and 148(*b*) are displaced between an open state and a closed state to press (e.g., pinch, squeeze, squash, etc.) on the top of each conically shaped paper roll 106 to flatten the top 110 of each conically shaped paper roll 106** into a flap.

The closing machine 102 may include a leadscrew 150 that may be arranged in a number of ways. For example, the leadscrew 150 may be secured to the support frame 122. Additionally, or alternatively, the leadscrew 150 may have a standalone support frame. In some examples, the leadscrew 150 may be configured to include a first end and a second end being opposite the first end. The leadscrew 150 may further be configured to travel in at least a first direction of travel and a second direction of travel. Additionally, or alternatively, the leadscrew 150 may be configured to rotate about its longitudinal axis. The leadscrew 150 may be actuated by the one or more motors 124(1)-**124(*n*). For example, the leadscrew 150 may be caused to rotate about its longitudinal axis by motor 124(*n*). Motor 124(*n*) may cause the leadscrew 150 to rotate about its longitudinal axis to cause the pair of plates 148(*a*) and 148(*b*) to be displaced between an open state and a closed state to flatten the top 110 of each conically shaped paper roll 106 into a flap. When in the open state, the pair of plates 148(*a*) and 148(*b*) are separated by a distance and when in the closed state, the pair of plates 148(*a*) and 148(*b*)** are in contact with each other.

The pair of plates 148(*a*) and 148(*b*) may include one or more guide pins 152. The one or more guide pins 152 to guide the pair of plates 148(*a*) and 148(*b*) between the open state and the closed state when the leadscrew 150 causes the pair of plates 148(*a*) and 148(*b*) to be displaced. The motor 124(*n*) may cause the leadscrew 150 to rotate about its longitudinal axis to cause the pair of plates 148(*a*) and 148(*b*) to be displaced between the open state and the closed state while the plurality of tamping rods 136 are displaced in the second direction 140. For example, the pair of plates 148(*a*) and 148(*b*) may be actuated, via motor 124(*n*), between the open state and the closed state simultaneously along with the displacement of the plurality of tamping rods 136 in the second direction 140.

The closing machine 102 may include an ejection system 154 that may be arranged in a number of ways. For example, the ejection system 154 may be arranged above the tray shuttle 128. Additionally, or alternatively, the ejection system 154 may be secured to the support frame 122. Additionally, or alternatively, the ejection system 154 may have a standalone support frame. The ejection system 154 may include a plurality of ejection rods 156 arranged in a row 158. The plurality of ejection rods 156 being displaceable in the second direction 140 perpendicular to the first direction 132 for pressing on the flap of each conically shaped paper roll 106 to press the flap into the top 110 of each conically shaped paper roll 106 into a dimple. For example, the tray shuttle 128 may be displaced in the first direction 132 such that the row 108 of the plurality of conically shaped paper rolls 106 are positioned directly below the plurality of ejection rods 156 such that when the plurality of ejection rods 156 are displaced in the second direction 140, at least a portion of the plurality of ejection rods 156 contacts the flap formed by the pair of plates 148(*a*) and 148(*b*) and press the flap into the top 110 of each conically shaped paper roll 106 into a dimple. Moreover, the plurality of ejection rods 156 being further displaceable in the second direction 140 perpendicular to the first direction 132 to displace the plurality of conically shaped paper rolls 106 out of the tray 104. For example, the plurality of ejection rods 156 may be displaced in the second direction to press the flap into the top 110 of each conically shaped paper roll 106 into a dimple and to eject the plurality of conically shaped paper rolls 106 out of the tray 104.

The tamping system 134, the pair of plates 148(*a*) and 148(*b*), and the ejection system 154 may be coupled together such that the tamping system 134, the pair of plates 148(*a*) and 148(*b*), and the ejection system 154 are displaced together in the second direction 140. For example, the tamping system 134, the pair of plates 148(*a*) and 148(*b*), and the ejection system 154 may be moveably coupled together on a support tower 160 fixed to the support frame 122. When the tray shuttle 128 is displaced in the first direction 132 such that the row 108 of the plurality of conically shaped paper rolls 106 are positioned directly below the plurality of tamping rods 136 (e.g., first stage), the plurality of tamping rods 136, the pair of plates 148(*a*) and 148(*b*), and the plurality of ejection rods 156 may be displaced together in the second direction 140 as the plurality of tamping rods 136 tamp the material 118 down toward the bottom 112 of each respective conically shaped paper roll 106. When the tray shuttle 128 is displaced in the first direction 132 such that the row 108 of the plurality of conically shaped paper rolls 106 are positioned directly below the pair of plates 148(*a*) and 148(*b*) (e.g., second stage), the plurality of tamping rods 136, the pair of plates 148(*a*) and 148(*b*), and the plurality of ejection rods 156 may be displaced together in the second direction 140 as the pair of plates 148(*a*) and 148(*b*) press on the top 110 of each conically shaped paper roll 106 to flatten the top 110 of each conically shaped paper roll 106 into a flap. Moreover, while the pair of plates 148(*a*) and 148(*b*) flatten the top 110 of each conically shaped paper roll 106, the plurality of tamping rods 136 simultaneously tamp the material in the plurality of conically shaped paper rolls arranged in the row adjacent to the conically shaped paper rolls being flattened by the pair of plates 148(*a*) and 148(*b*). When the tray shuttle 128 is displaced in the first direction 132 such that the row 108 of the plurality of conically shaped paper rolls 106 are positioned directly below the plurality of ejection rods 156 (e.g., third stage), the plurality of tamping rods 136, the pair of plates 148(*a*) and 148(*b*), and the plurality of ejection rods 156 may be displaced together in the second direction 140 as the plurality of ejection rods 156 press on the flap of each conically shaped paper roll 106 to press the flap into the top 110 of each conically shaped paper roll 106 into a dimple and eject the plurality of conically shaped paper rolls 106 out of the tray 104. Moreover, while the plurality of ejection rods 156 dimple and eject the plurality of conically shaped paper rolls 106, the plurality of tamping rods 136 simultaneously tamp the material in the plurality of conically shaped paper rolls arranged in the row adjacent to the conically shaped paper rolls being flattened by the pair of plates 148(*a*) and 148(*b*).

Figure 2:
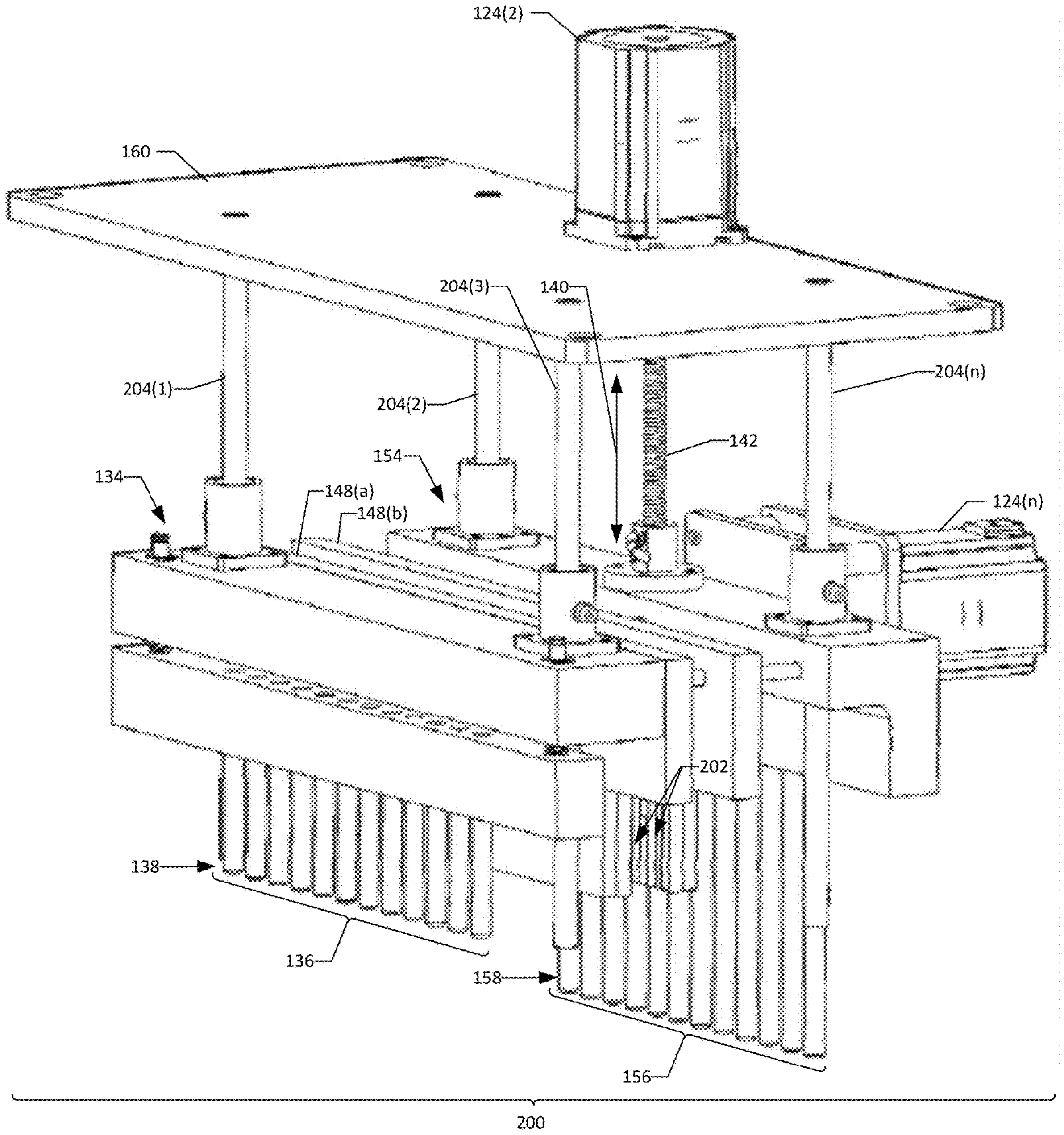
FIG. 2 illustrates a perspective view of a tamping system, a pair of plates, and an ejection system of the automated paper roll closing machine system of FIG. 1 coupled together according to an embodiment of the instant application.

FIG. 2 illustrates a perspective view 200 of the tamping system 134, the pair of plates 148(*a*) and 148(*b*), and the ejection system 154 coupled together without showing the tray 104, the support frame 122, and the tray shuttle 128 for the sake of clarity and is not intended to be limiting in any manner. FIG. 2 illustrates the plurality of tamping rods 136 arranged in the row 138. The plurality of tamping rods 136 may be arranged in the row 138 to match the plurality of conically shaped paper rolls 106 arranged in the row 108 in the tray 104. The pair of plates 148(*a*) and 148(*b*) may be arranged adjacent to the plurality of tamping rods 136 arranged in the row 138. The plurality of plates 148(*a*) and 148(*b*) may include cooperating serrations 202 disposed on opposing surfaces of the pair of plates 148(*a*) and 148(*b*) to provide for flattening the top of each conically shaped paper roll into a flap. FIG. 2 illustrates the plurality of ejection rods 156 arranged in the row 158 adjacent to the plurality of plates 148(*a*) and 148(*b*). Similar to the plurality of tamping rods 136, the plurality of ejection rods 156 may be arranged in the row 158 to match the plurality of conically shaped paper rolls 106 arranged in the row 108 in the tray 104. The plurality of tamping rods 136, the pair of plates 148(*a*) and 148(*b*), and/or the plurality of ejection rods 156 may be formed of a metal (e.g., steel, stainless steel, brass, aluminum, etc.). The tamping system 134, the pair of plates 148(*a*) and 148(*b*), and the ejection system 154 may be coupled together such that the plurality of tamping rods 136, the pair of plates 148(*a*) and 148(*b*), and/or the plurality of ejection rods 156 are displaced in the second direction 140 together simultaneously. For example, the tamping system 134, the pair of plates 148(*a*) and 148(*b*), and the ejection system 154 may be moveably coupled together via one or more guide rods 204(1), 204(2), 204(3), and 204(*n*) that guide the tamping system 134, the pair of plates 148(*a*) and 148(*b*), and the ejection system 154 simultaneously in the second direction 140. The tamping system 134, the pair of plates 148(*a*) and 148(*b*), and the ejection system 154 may be moveably coupled together via the one or more guide rods 204(1)-204(*n*) such that the plurality of tamping rods 136, the pair of plates 148(*a*) and 148(*b*), and/or the plurality of ejection rods 156 are each displaced simultaneously in the second direction 140 together when the motor 124(2) causes the leadscrew 142 to rotate about its longitudinal axis.

Figure 3:
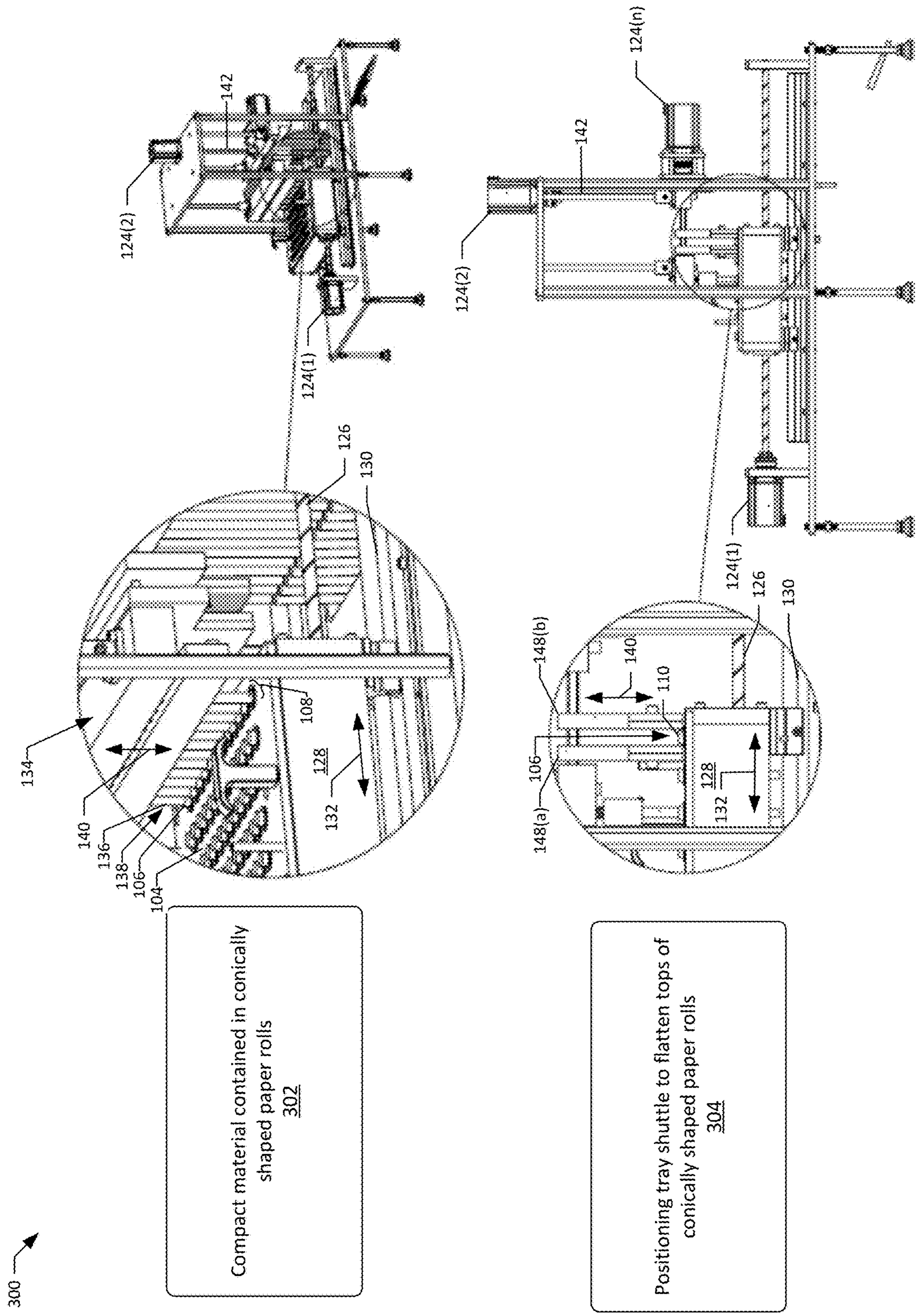
FIGS. 3 and 4 illustrate a flow diagram of an example process of the automated paper roll closing machine system of FIG. 1 for closing a plurality of conically shaped paper rolls alongside corresponding schematic diagrams illustrating the acts being described in the flow diagram according to an embodiment of the instant application.
Figure 4:
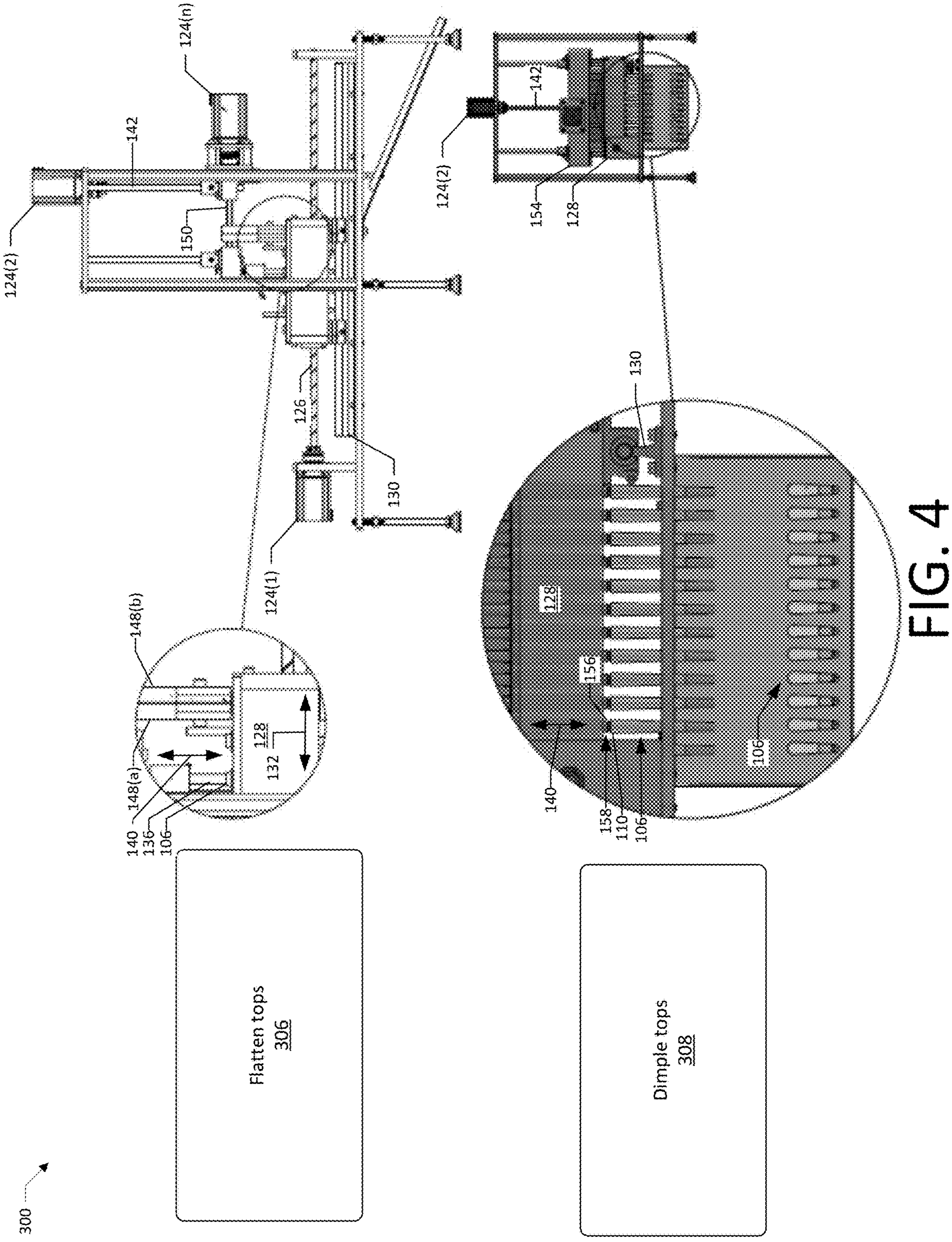

FIGS. 3 and 4 illustrate a flow diagram of an example process 300 of an automated paper roll closing machine system 102 for closing a plurality of conically shaped paper rolls (e.g., plurality of conically shaped paper rolls 106) alongside corresponding schematic diagrams illustrating the acts being described in the flow diagram according to an embodiment of the instant application. The process 300 may be for closing the plurality of conically shaped paper rolls arranged in a row (e.g., row 108) in a tray (e.g., tray 104) removeably received by a tray shuttle (e.g., tray shuttle 128). The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems.

Process 300 includes an operation 302, which represents compacting a processed agricultural material (e.g., material 118) contained in each conically shaped paper roll (e.g., conically shaped paper roll 106). For example, a tamping system (e.g., tamping system 134) including a plurality of tamping rods (e.g., plurality of tamping rods 136) arranged in a row (e.g., row 138) and displaceable in a second direction (e.g., second direction 140) perpendicular to a first direction (e.g., first direction 132) may be actuated to compact the material contained in each of the conically shaped paper rolls down toward the bottom (e.g., bottom 112) of each respective conically shaped paper roll. Operation 302 may include a tray shuttle (e.g., tray shuttle 128) being displaced in the first direction such that the row of the plurality of conically shaped paper rolls are positioned directly below the plurality of tamping rods such that when the plurality of tamping rods are displaced in the second direction, at least a portion of the plurality of tamping rods contacts the material contained in the plurality of conically shaped paper rolls and tamp the material down toward the bottom of each respective conically shaped paper roll. Operation 302 may include operating a motor (e.g., motor 124(2)) to cause a leadscrew (e.g., leadscrew 142) to rotate about its longitudinal axis to cause the plurality of tamping rods to be displaced in the second direction. Operation 302 may include a user placing a tray (e.g., tray 104), loaded with the plurality of conically shaped paper rolls arranged in a row (e.g., row 108), into the tray shuttle. Operation 302 may include operating a motor (e.g., motor 124(1)) to cause a leadscrew (e.g., leadscrew 126) to rotate about its longitudinal axis to cause the tray shuttle to be displaced in the first direction along a rail system (e.g., rail system 130). In some examples, the user may turn on the closing machine by pressing a button and/or actioning a display. Additionally, or alternatively, the user may select a desired operation setting for the closing machine by touching GUI elements presented on a display. Additionally, or alternatively, the user may begin the automated operation of the closing machine by touching a GUI element presented on the display.

Process 300 may continue with operation 304, which represents positioning the tray shuttle to flatten the top (e.g., top 110) of each conically shaped paper roll into a flap. For example, the tray shuttle may be displaced in the first direction such that the row of the plurality of conically shaped paper rolls are positioned directly below and/or between a pair of plates (e.g., pair of plates 148(*a*) and 148(*b*)) in an open state. For example, operation 304 may include operating a motor (e.g., motor 124(1)) to cause a leadscrew (e.g., leadscrew 126) to rotate about its longitudinal axis to cause the tray shuttle to be displaced in the first direction along the rail system such that each top of each conically shaped paper roll are positioned directly below and/or between the pair of plates that are in an open state. Operation 304 may include operating a motor (e.g., motor 124(2)) to cause a leadscrew (e.g., leadscrew 142) to rotate about its longitudinal axis to cause the pair of plates in the open state to be displaced in the second direction such that the pair of plates are positioned adjacent to the tops of the conically shaped paper rolls arranged in the row.

Operation 304 may be followed by operation 306, which represents flattening the tops of the conically shaped paper rolls arranged in the row. Operation 306 may include operating a motor (e.g., motor 124(*n*)) to cause a leadscrew (e.g., leadscrew 150) to rotate about its longitudinal axis to cause the pair of plates to be displaced from the open state to a closed state to flatten the top of each conically shaped paper roll into a flap. Operation 306 may include operating a motor (e.g., motor 124(2)) to cause a leadscrew (e.g., leadscrew 142) to rotate about its longitudinal axis to cause the pair of plates to be displaced in the second direction while simultaneously operating the motor (e.g., motor 124(*n*)) to cause the leadscrew (e.g., leadscrew 150) to rotate about its longitudinal axis to cause the pair of plates to be displaced from the open state to the closed state to flatten the top of each conically shaped paper roll into a flap. Operation 306 may further include operating the motor (e.g., motor 124(2)) to cause the leadscrew (e.g., leadscrew 142) to rotate about its longitudinal axis to cause the plurality of tamping rods to be displaced in the second direction and tamp the material contained in adjacent conically shaped paper rolls while simultaneously operating the motor (e.g., motor 124(*n*)) to cause the leadscrew (e.g., leadscrew 150) to rotate about its longitudinal axis to cause the pair of plates to be displaced from the open state to the closed state to flatten the top of each conically shaped paper roll into a flap. Operation 306 may include operating the motor (e.g., motor 124(2)) to cause the leadscrew (e.g., leadscrew 142) to rotate about its longitudinal axis to cause the plurality of tamping rods to be displaced in the second direction up and down consecutively three (3) times to tamp the material contained in the conically shaped paper rolls. Operation 306 may further include ceasing the displacement of the tamping rods for a period of time while the plurality of tamping rods are positioned down in the conically shaped paper rolls simultaneously while the pair of plates are displaced in the closed state and flattening the tops of each conically shaped paper roll into a flap.

Process 300 may be completed at operation 308, which represents dimpling the tops of the conically shaped paper rolls. For example, an ejection system (e.g., ejection system 154) including a plurality of ejection rods (e.g., ejection rods 156) arranged in a row (e.g., row 158) and displaceable in the second direction (e.g., second direction 140) perpendicular to the first direction (e.g., first direction 132) may be actuated to press on the flap of each conically shaped paper roll and presses the flap into the top of each conically shaped paper roll into a dimple. For example, the tray shuttle may be displaced in the first direction such that the row of the plurality of conically shaped paper rolls are positioned directly below the plurality of ejection rods such that when the plurality of ejection rods are displaced in the second direction, at least a portion of the plurality of ejection rods press on the flap of each conically shaped paper roll and presses the flap into the top of each conically shaped paper roll into a dimple. Operation 308 may include operating a motor (e.g., motor 124(2)) to cause a leadscrew (e.g., leadscrew 142) to rotate about its longitudinal axis to cause the plurality of ejection rods to be displaced in the second direction. Operation 308 may include operating a motor (e.g., motor 124(1)) to cause a leadscrew (e.g., leadscrew 126) to rotate about its longitudinal axis to cause the tray shuttle to be displaced in the first direction along the rail system (e.g., rail system 130) such that the row of the plurality of conically shaped paper rolls are positioned directly below the plurality of ejection rods. Operation 308 may include operating the motor (e.g., motor 124(2)) to cause a leadscrew (e.g., leadscrew 142) to rotate about its longitudinal axis to cause the plurality of ejection rods to be displaced in the second direction to displace the plurality of conically shaped paper rolls out of the tray and onto an ejection ramp. The ejected conically shaped paper rolls being fully closed and containing the material for repurpose use.

As used herein, a processor, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor(s) may possess its own local memory, which also may store program components, program data, and/or one or more operating systems.

The memory may include volatile and nonvolatile memory, removable and non-removable media implemented in any method or technology for storage of information, such as computer-readable instructions, data structures, program component, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which may be used to store the desired information, and which may be accessed by the processor(s).

Figure 5:
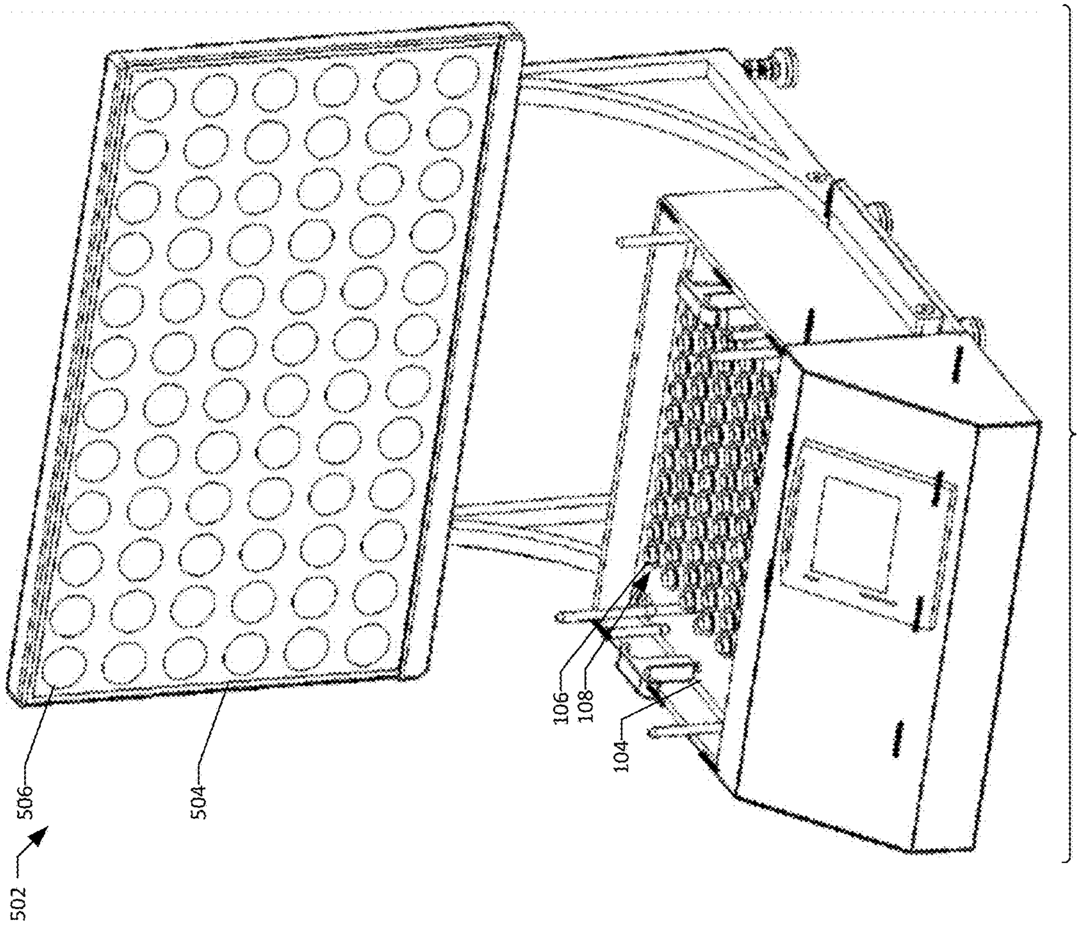
FIG. 5 illustrates an example weighing machine arrangeable with the automated paper roll closing machine system in FIG. 1 according to an embodiment of the instant application.

FIG. 5 illustrates a perspective view 500 of an example weighing machine 502. The weighing machine 502 may be arranged with the closing machine 102. The weighing machine 502 may removeably receive the tray 104 including the plurality of conically shaped paper rolls 106 arranged in rows 108. For example, a user may place the tray 104 into the weighing machine 502 subsequent to the tray 104 being loaded with the plurality of conically shaped paper rolls 106 to determine if a desired amount of the material 118 is contained in each conically shaped paper roll. For example, the weighing machine 502 may include a plurality of load cells arranged in the weighing machine 502 and configured to determine a desired weight of the material contained in each conically shaped paper roll. In another example, a user may place the tray 104 into the weighing machine 502 prior to the closing machine closing the plurality of conically shaped paper rolls. The load cells may be arranged in one or more rows similar to the rows arranged in the tray 104. Each load cell for weighing the material contained in each conically shaped paper roll 106. The weighing machine 502 being capable of determining a weight of the material contained in each conically shaped paper roll 106. While FIG. 5 illustrates the weighing machine 502 includes six (6) rows of load cells for weighing a plurality of conically shaped paper rolls, the weighing machine 502 may have any number of rows of load cells. Further, while FIG. 5 illustrates the weighing machine 502 includes twelve (12) load cells in each row for weighing a plurality of conically shaped paper rolls, each row may have any number of load cells for weighing a plurality of conically shaped paper rolls. The weighing machine 502 including a display 504 configured to present the respective weight of the material contained in each conically shaped paper roll. The display 504 displaying a pass/fail (e.g., go/no go) indication to a user. For example, the display 504 may present a plurality of pass/fail icons 506 representing each conically shaped paper roll received in rows in the tray 104. The display 504 may present a first type of icon (e.g., green colored icon, "yes" marked icon, thumbs up icon, etc.) indicating the respective conically shaped paper roll contains the desired amount of material. The display 504 may present a second type of icon (e.g., red colored icon, "no" marked icon, thumbs down icon, etc.) indicating the respective conically shaped paper roll does not contain the desired amount of material. While FIG. 5 illustrates the display 504 presenting pass/fail indications to a user, the display 504 may present respective numeric weight value indications to a user. If the weighing machine 502 determines one or more of the plurality of conically shaped paper rolls fails to contain the desired amount of material and has less than the desired amount of material, a user may proceed to add additional material to the conically shaped paper roll such that the conically shaped paper roll does containing the desired amount of material. If one or more of the plurality of conically shaped paper rolls fails to contain the desired amount of material and has more than the desired amount of material, a user may proceed to remove material from the conically shaped paper roll such that the conically shaped paper roll contains the desired amount of material. Subsequent to the weighing machine 502 indicating that the plurality of conically shaped paper rolls each contain the desired amount of material, a user may remove the tray 104 from the weighing machine 502 and place the tray 104 into the tray shuttle 128 for compacting and closing the conically shaped paper rolls containing the desired amount of material.

Figure 6:
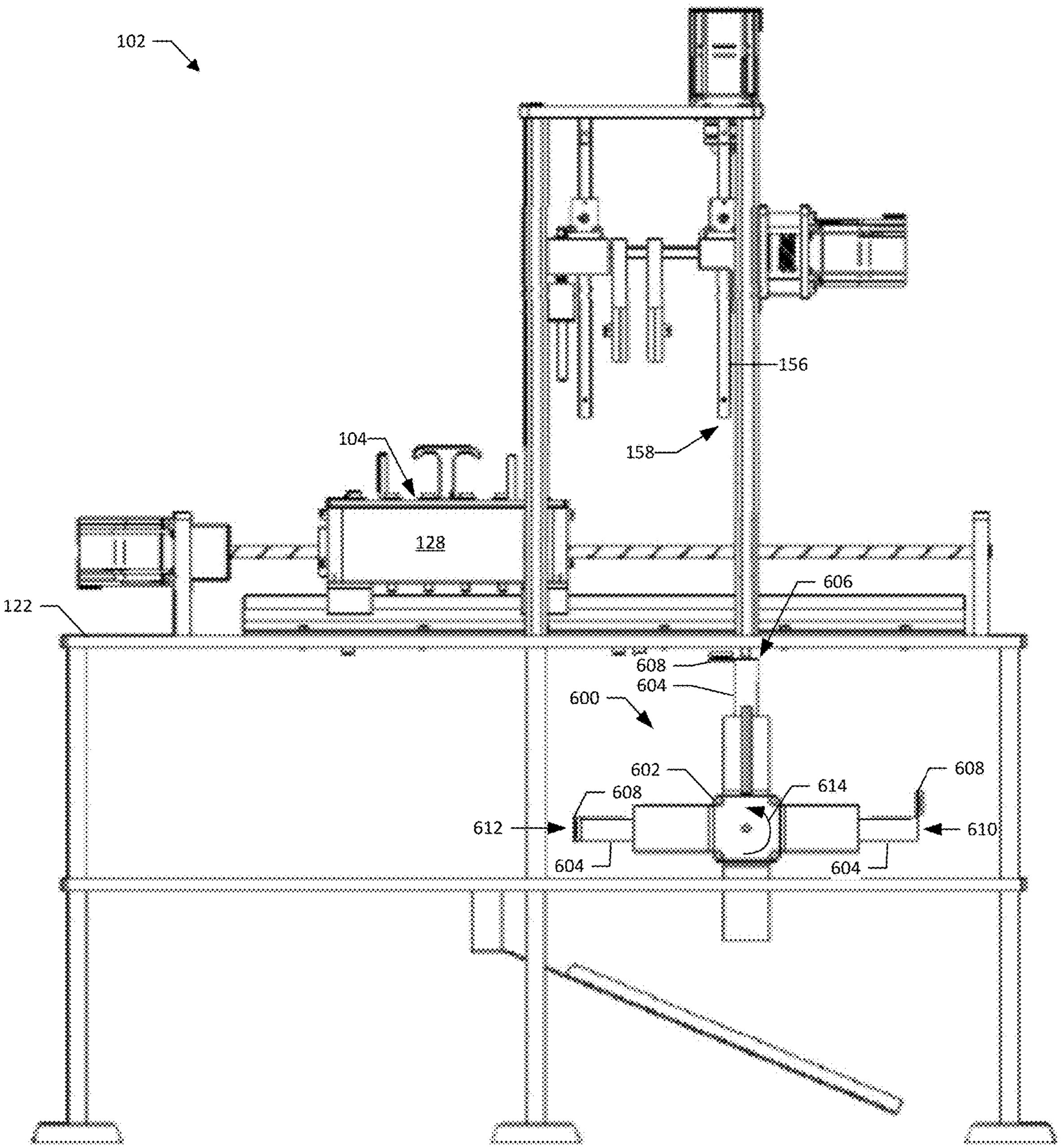
FIG. 6 illustrates an example closing machine arranged with the automated paper roll closing machine system of FIG. 1 according to an embodiment of the instant application.
Figure 7A:
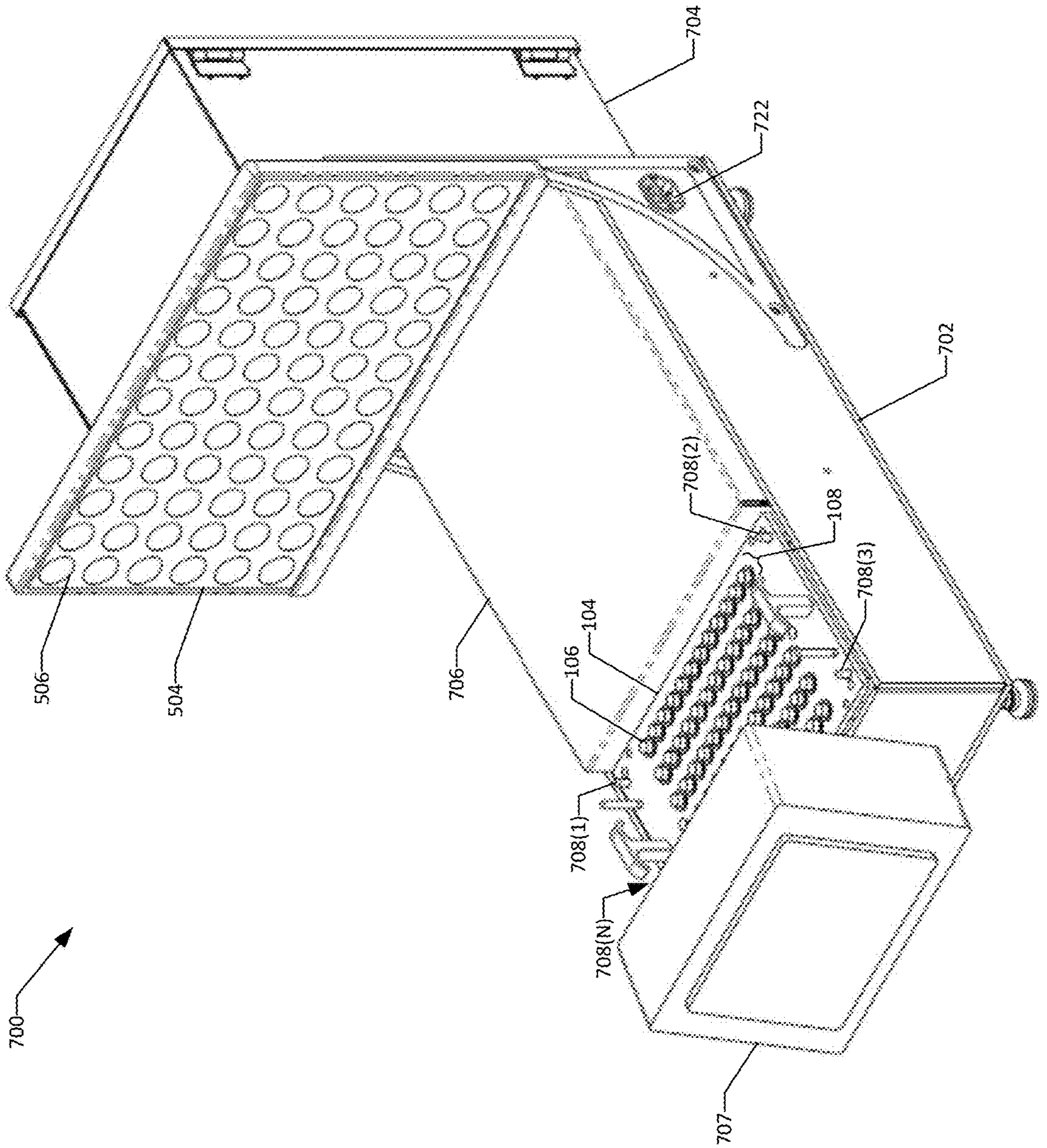
FIGS. 7A-D collectively illustrate another example weighing machine according to an embodiment of the instant application.
Figure 7B:
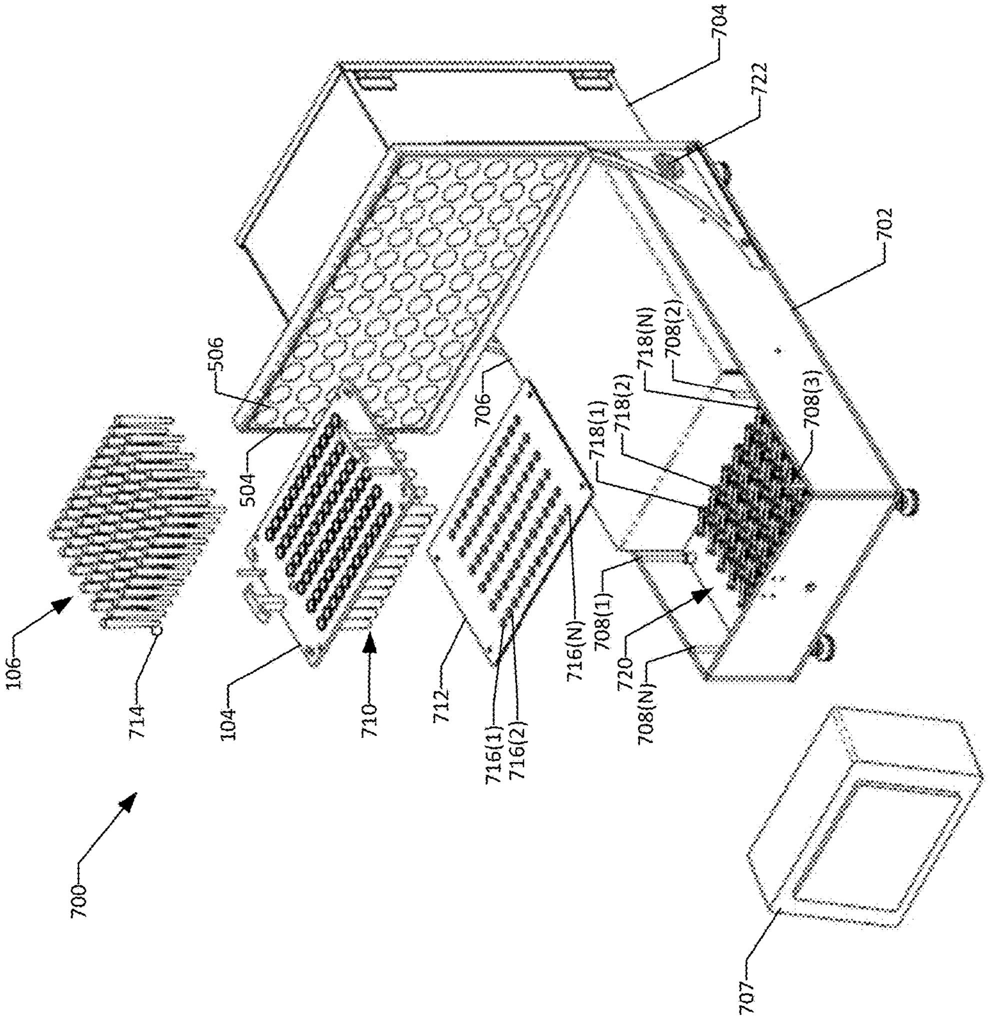
Figure 7C:
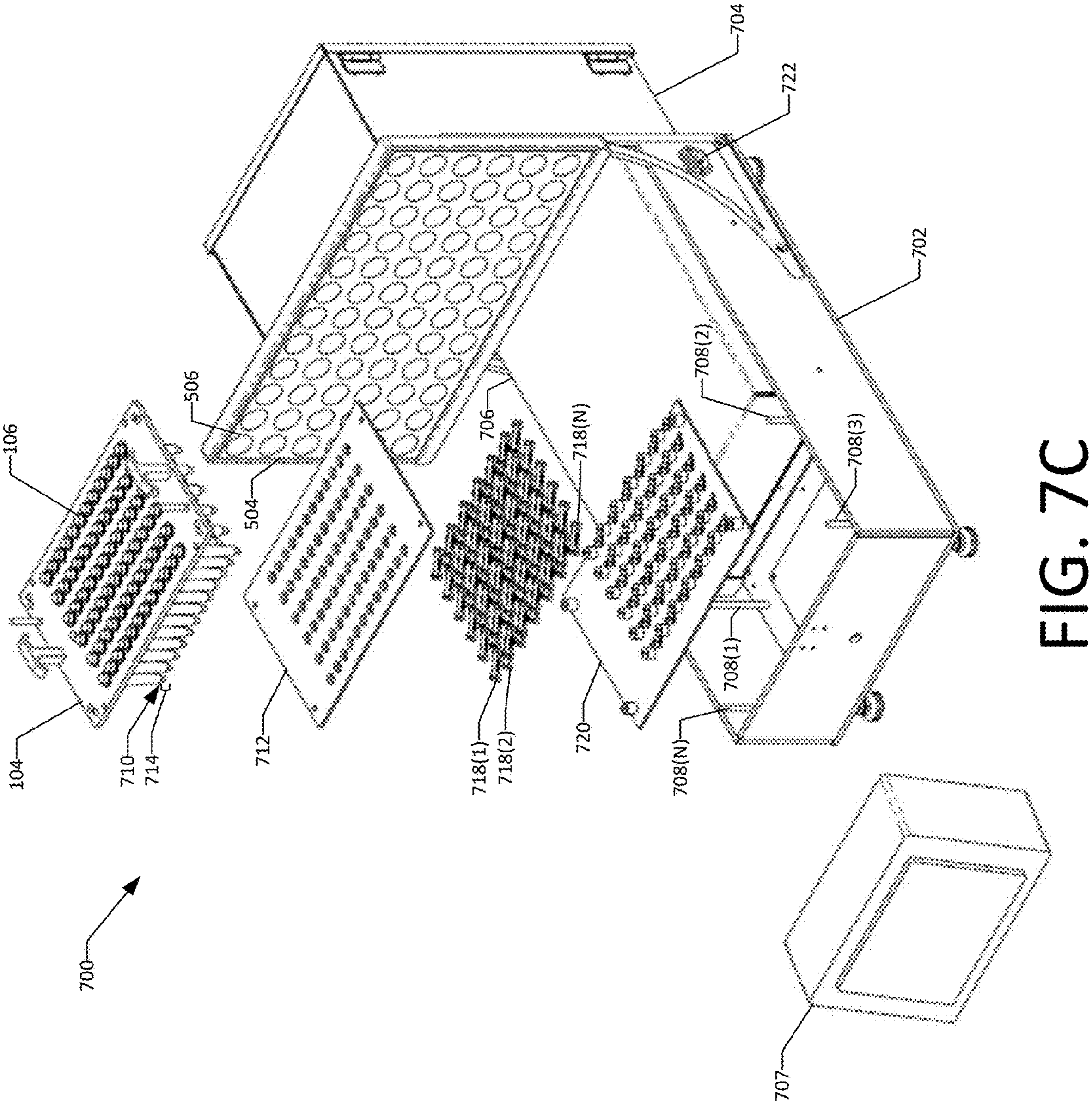
Figure 7D:
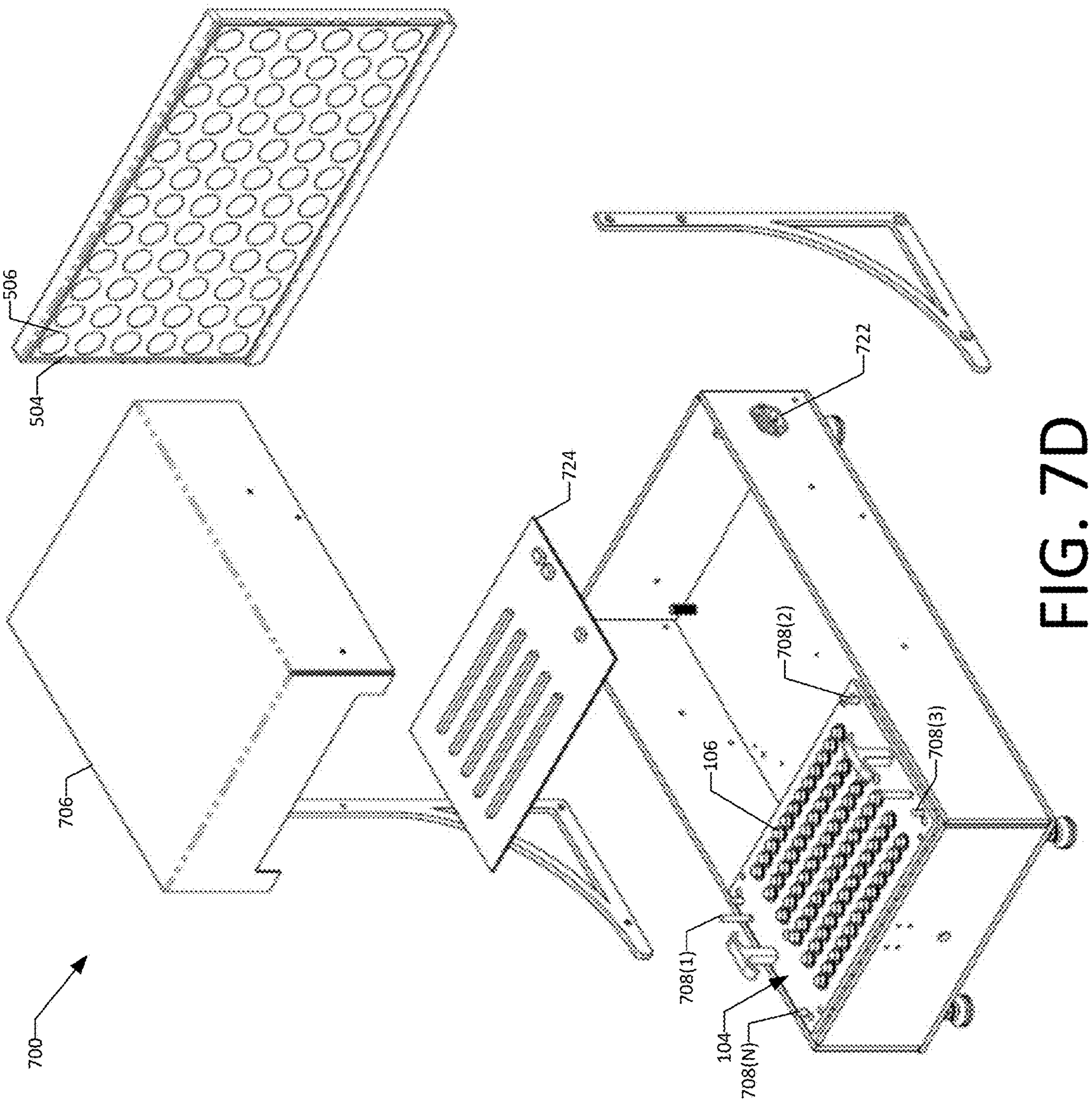

FIG. 6 illustrates an example packaging machine 600 arranged with the automated paper roll closing machine system 102 of FIG. 1 according to an embodiment of the instant application. The packaging machine 600 may be arranged with the plurality of ejection rods 156. For example, the packaging machine 600 may be arranged directly below the plurality of ejection rods 156. The packaging machine 600 may include an upright wheel 602. The upright wheel 602 for removeably holding a plurality of packaging receptacles 604 in a row 606. For example, the upright wheel 602 may include a plurality of openings configured to hold the plurality of packaging receptacles 604 in a row that substantially matches the plurality of conically shaped paper rolls 106 arranged in the row 108. The plurality of packaging receptacles 604 for receiving the plurality of conically shaped paper rolls 106 displaced out of the tray 104. Each of the packaging receptacles 604 including a lid 608 displaceable between an open position 610 and a closed position 612. When the upright wheel 602 rotates 614, the packaging machine 600 displaces the lid 608 from the open position 610 to the closed position 612 subsequent to the plurality of conically shaped paper rolls 106 being received by the plurality of packaging receptacles 604.

FIGS. 7A-D collectively illustrate an example weighing machine 700 according to an embodiment of the instant application. The weighing machine 700 may be the same as the weighing machine 502 configured to removeably receive the tray 104 including the plurality of conically shaped paper rolls 106 arranged in rows 108. Inasmuch as FIGS. 7A-D depict the weighing machine 700, while referring to the same elements and features of the weighing machine 502, the following discussion of specific features may refer interchangeably to any of FIGS. 1-6 except where explicitly indicated. For example, FIGS. 7A-D illustrate an embodiment of the weighing machine 700, including the display 504 presenting the plurality of pass/fail icons 506. Here, in this embodiment, the weighing machine 700 may include a main body 702, an electrical enclosure 704, a cover 706, and a HMI (Human Machine Interface) 707.

Similar to the weighing machine 502, the weighing machine 700 may removeably receive the tray 104 that includes the plurality of conically shaped paper rolls 106 arranged in rows 108. For example, a user may place the tray 104 onto guides 708(1), 708(2), 708(3), and 708(N) and/or slideably displace the tray 104 along the guides 708(1)-708(N) until a bottom 710 of the tray 104 rests on a cover plate 712. A portion 714 of each of the plurality of conically shaped paper rolls 106 may individually pass through openings 716(1), 716(2), . . . , 716(N) disposed in the cover plate 712.

The plurality of conically shaped paper rolls 106 may be aligned by the cover plate 712 to come into contact with load cells 718(1), 718(2), . . . , 718(N) individually. The load cells 718(1)-718(N) may be mounted on a surface of a plate 720. The plate 720 may be disposed on the guides 708(1)-708(N) below the cover plate 712 in the main body 702. The load cells 718(1)-718(N) may be arranged in rows similar to the rows 108 disposed in the tray 104, such that the plurality of conically shaped paper rolls 106 are removeably received by the openings disposed in the tray 104 are aligned with the load cells 718(1)-718(N) mounted on the plate 720. The guides 708(1)-708(N) may be disposed on a surface in the main body 702. The guides 708(1)-708(N) may provide for aligning the tray 104 and the cover plate 712 in the main body 702, such that the plurality of conically shaped paper rolls come into contact with the load cells 718(1)-718(N). While FIGS. 7A-D illustrate that the guides 708(1)-708(N) may include rods, the guides 708(1)-708(N) may include rails, grooves, detents, hooks, magnets, etc, Each individual load cell of the load cells 718(1)-718(N) may be activated by each conically shaped paper roll 106 of the plurality of conically shaped paper rolls 106. The weighing machine 700 may receive power via a power connector 722. For example, the display 504, the HMI 707, the load cells 718(1)-718(N), and/or an interconnection board 724 may receive power via the power connector 722.

Signals from the load cells 718(1)-718(N) may be continuously sent to the interconnection board 724. The interconnection board 724 may comprise an amplifier board configured to constantly receive signals sent from the load cells 718(1)-718(N). The interconnection board 724 may amplify the signals enough to be readable by a machine control unit (e.g., a programmable logic controller (PLC)) (shown in FIG. 8).

Figure 8:
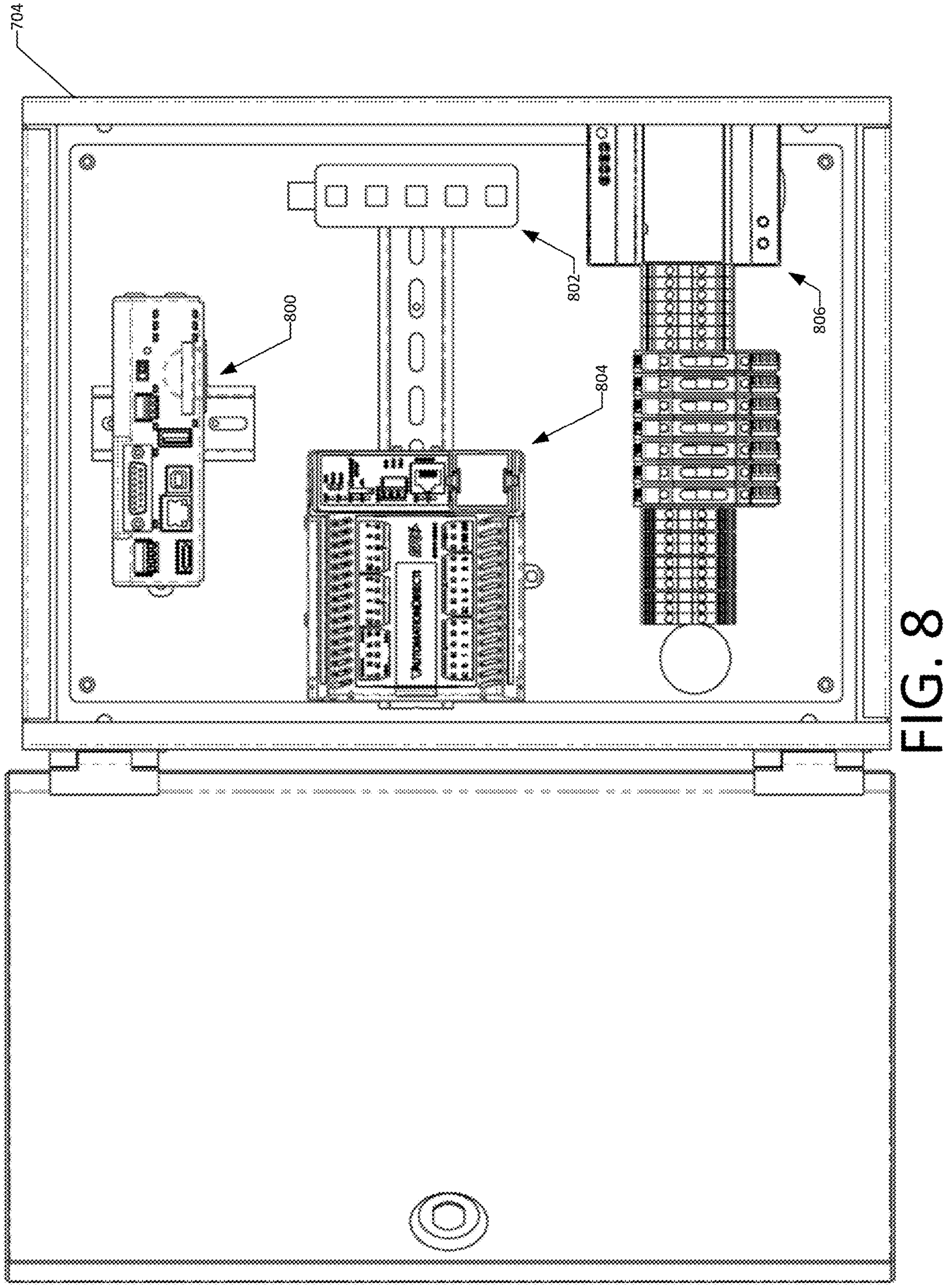
FIG. 8 illustrates an example electrical enclosure of the weighing machine illustrated in FIGS. 7A-D housing a communication unit, a switch unit, a machine control unit, and/or a power supply unit according to an embodiment of the instant application.

FIG. 8 illustrates the electrical enclosure 704 housing a display module 800, a switch unit 802, a machine control unit 804, and/or a power supply unit 806. The display module 800 may comprise a remote communication input/output unit including HD pixel screen resolution HDMI output, CPU, serial ports, USB, Type A and B ports, and Ethernet port. The switch unit 802 may comprise an ethernet switch (e.g., a 5-port 10/100BASE-TX RJ45 with auto MDI/MDI-X function). The machine control unit 804 may comprise programmable logic controller (PLC). The power supply unit 806 may comprise an AC/DC power supply unit (e.g., an AC/DC power supply—1 output—12V @7.1 A—85.2 W). The power supply unit 806 may receive power via the power connector 722.

Figure 9:
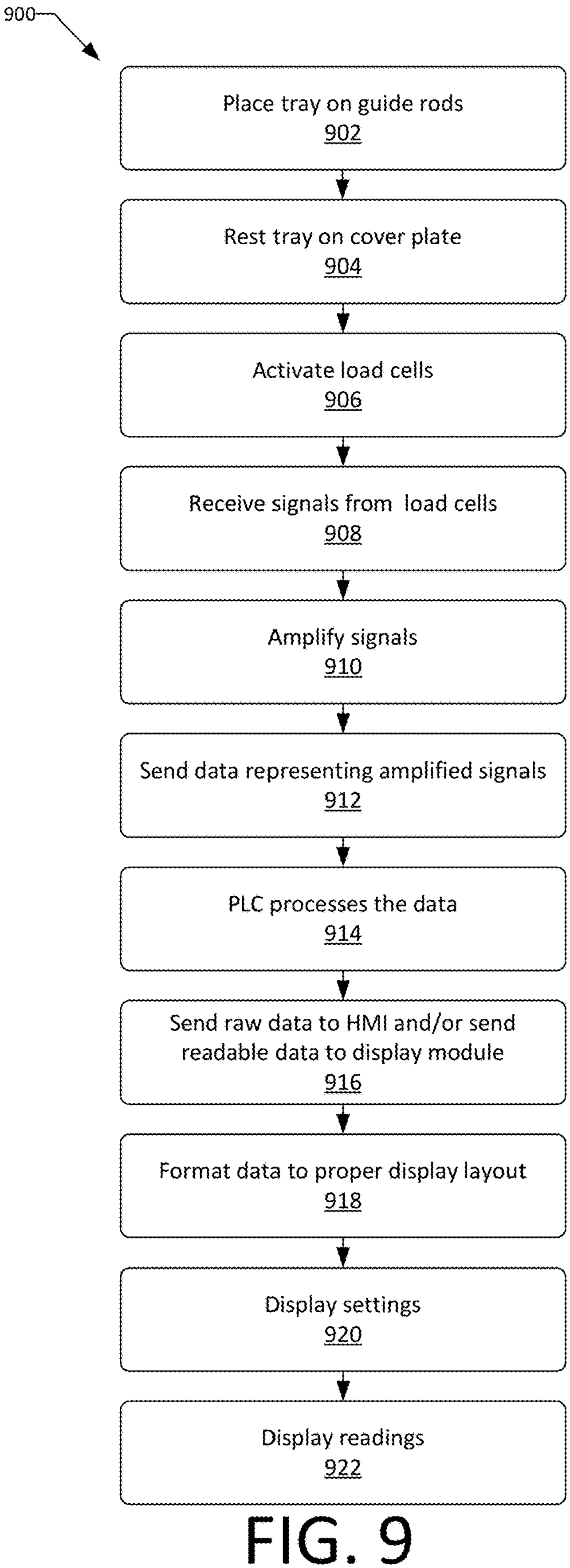
FIG. 9 illustrates a flow diagram of an example process of the weighing machine of FIGS. 7A-D for determining if a desired amount of material contained in each conically shaped paper roll according to an embodiment of the instant application.

FIG. 9 illustrates a flow diagram of an example process 900 that the weighing machine 700 of FIGS. 7A-D may implement for determining if a desired amount of the material 118 is contained in each conically shaped paper roll. For example, the weighing machine 700 may determine a desired weight of the material contained in each conically shaped paper roll. Each of the load cells 718(1)-718(N) of the weighing machine 700 is capable of measuring from at least about 0 g up to at most about 100 g. The desired weight of the material contained in each conically shaped paper roll may be at least about 0.3 g to at most about 2 g. The process 900, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by interconnection board 724, the display module 800, the switch unit 802, the machine control unit 804, the power supply unit 806, the display 504, the HMI 707, and/or a combination thereof.

An operation 902 represents a user placing the tray 104 on the guides 708(1)-708(N). In one example, operation 902 may represent the user sliding the tray 104 down along the guides 708(1)-708(N).

An operation 904 represents the user resting the tray 104 on the cover plate 712. In one example, operation 904 may represent the user resting the bottom 710 of the tray 104 on the cover plate 712. In one example, operation 904 may represent the plurality of conically shaped paper rolls removeably received by the openings disposed in the tray 104 passing through the openings 716(1)-716(N) disposed in the cover plate 712 and/or coming into contact with the load cells 718(1)-718(N) individually.

An operation 906 represents activating the load cells 718(1)-718(N). In one example, operation 906 may represent each portion 714 of each of the plurality of conically shaped paper rolls 106 coming into contact with each load cell of the load cells 718(1)-718(N) and activating each load cell of the load cells 718(1)-718(N). For example, respective bottoms 112 of the respective conically shaped paper rolls 106 may come into contact with respective load cells of the plurality of load cells 718(1)-718(N). The load cells 718(1)-718(N) continuously send signals to the interconnection board 724 associated with the weight of the conically shaped paper rolls 106 and/or material contained therein.

An operation 908 represents receiving signals from the load cells 718(1)-718(N). In one example, operation 908 may represent the interconnection board 724 receiving each load cell signal individually from the load cells 718(1)-718(N). For example, once mass is placed on to the load cells 718(1)-718(N), each load cell independently sends a raw value (e.g., measured electric current) to the interconnection board 724. Each load cell is a force transducer that converts an input mechanical force (e.g., a load, a weight, a tension, compression, pressure, etc.) into an electrical output signal that can be measured, converted, and standardized. As the force applied to the load cell increases, the electrical signal changes proportionally.

An operation 910 represents amplifying the signals received from the load cells 718(1)-718(N). In one example, operation 910 may represent the interconnection board 724 amplifying the signals received from the load cells 718(1)-718(N) enough to be readable by the machine control unit 804. The signals produced by a load cell are mostly in mV (millivolt). Load cell amplifiers of the interconnection board 724 convert the mV signal into a more powerful signal (e.g., 4-20 mA, 0-10 VDC, ±10 VDC, RS232, RS485, USB, etc.). For example, the load cells and the amplifier may operate in a range of 4-20 mA in direct relation to 0-10 VDC.

An operation 912 represents sending data representing the amplified signals. In one example, operation 912 may represent the interconnection board 724 sending the data representing the amplified signals to the machine control unit 804. For example, operation 912 may represent the interconnection board 724 sending the data representing the amplified signals to the machine control unit 804 as a solid stream for the machine control unit 804 to split apart and allocate signals to display. The data from the interconnection board 724 may be sent to the machine control unit 804 as a stream of information with each signal from each load cell being separated by symbols (e.g., unintelligible symbols). Each symbol is representative of a specific load cell. This way when the machine control unit 804 receives the information, the machine control unit 804 may separate the signals and allocate them to their representative places on both the HMI 707 and the display 504. As discussed above, the display 504 may display a pass/fail (e.g., go/no go) indication to a user. Moreover, the display 504 may display a current weight and/or an indicator (e.g., arrow up/arrow down) to let a user know if a weight of material contained in each paper roll is under a desired amount (e.g., set target weight) or over the desired amount. The weighing machine 700 may include a tare/zero balance function.

An operation 914 represents processing the data. In one example, operation 914 may represent the machine control unit 804 processing the data to split the stream apart. In one example, operation 914 may further represent the machine control unit 804 processing the data using scaling on each individual signal per cell.

An operation 916 represents sending raw data to the HMI 707 and/or send readable data to display module 800. In one example, operation 916 may represent the machine control unit 804 using scaling to send the raw data to the HMI 707. In one example, operation 916 may represent the machine control unit 804 sending readable data to the display module 800. The switch unit 802 providing for the communication between the HMI 707, the machine control unit 804, and the display module 800.

An operation 918 represents formatting data to a proper display layout. In one example, operation 918 represents the display module 800 receiving data from the machine control unit 804 and formatting the data to proper display layout.

An operation 920 represents displaying settings. In one example, operation 920 represents the HMI 707 displaying settings. For example, in a calibration mode, the HMI 707 may display raw values of each load cell for calibration processes. The HMI 707 may be configured to process all inputs. The HMI 707 may be configured to receive inputs, instructions, commands, etc. from a user (e.g., an operator, line operator, manager, supervisor, etc.) to calibrate and/or control the weighing machine.

An operation 922 concludes the illustration of the process 900 and represents displaying readings. In one example, operation 922 represents the display 504 displaying readings. For example, as discussed above with regard to FIG. 5, the display 504 may present a plurality of pass/fail icons 506 representing each conically shaped paper roll received in rows in the tray 104.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A weighing machine comprising:

a plurality of load cells configured to weigh a material contained in individual conically shaped paper rolls of a plurality of conically shaped paper rolls, wherein the individual conically shaped paper rolls include a top having a first diameter and a bottom having a second diameter that is less than the first diameter;

one or more guide rods disposed on a surface in the weighing machine, wherein the one or more guide rods align the plurality conically shaped paper rolls with the plurality of load cells, respectively;

a programmable logic controller configured to receive signals from the plurality of load cells and process the signals into readable data;

a remote communication input/output unit configured to:

receive, from the programmable logic controller, the readable data, and process the readable data to a display layout representing readable information of a weight of the material contained in the individual conically shaped paper rolls; and a display unit configured to:

receive, from the remote communication input/output unit, data representing the display layout, and display the readable information of the weight of the material contained in the respective conically shaped paper rolls.

2. The weighing machine of claim 1, further comprising an interconnection board configured to receive and amplify the signals, wherein the programmable logic controller receives the signals from the interconnection board.

3. The weighing machine of claim 1, further comprising a tray for removeably receiving the plurality of conically shaped paper rolls.

4. The weighing machine of claim 3, wherein the one or more guide rods align the tray with the plurality of load cells such that the respective bottoms of the individual conically shaped paper rolls come into contact with individual load cells of the plurality of load cells.

5. The weighing machine of claim 1, further comprising:

a cover plate having a plurality of openings, the cover plate disposed on the one or more guide rods above the plurality of load cells such that a portion of the plurality of conically shaped paper rolls pass through the plurality of openings and are aligned by the cover plate to come into contact with the plurality of load cells.

6. The weighing machine of claim 1, wherein the plurality of load cells are mounted on a plate disposed on the one or more guide rods on the surface in the weighing machine.

7. The weighing machine of claim 1, wherein the plurality of load cells are arranged in one or more rows.

8. A weighing machine comprising:

a plurality of load cells configured to weigh a material contained in individual conically shaped paper rolls of a plurality of conically shaped paper rolls;

one or more guide rods disposed on a surface in the weighing machine, the one or more guide rods align the plurality of conically shaped paper rolls with the plurality of load cells;

a programmable logic controller configured to receive signals from the plurality of load cells and process the signals into readable data; and a display unit configured to:

receive, from a remote communication input/output unit, data representing a display layout representing readable information of a weight of the material contained in the individual conically shaped paper rolls, and display the readable information of the weight of the material contained in the respective conically shaped paper rolls.

9. The weighing machine of claim 8, further comprising an interconnection board configured to receive and amplify the signals, wherein the programmable logic controller receives the signals from the interconnection board.

10. The weighing machine of claim 8, further comprising a tray for removeably receiving the plurality of conically shaped paper rolls.

11. The weighing machine of claim 10, wherein the one or more guide rods align the tray with the plurality of load cells such that respective bottoms of the individual conically shaped paper rolls come into contact with individual load cells of the plurality of load cells.

12. The weighing machine of claim 8, further comprising:

a cover plate having a plurality of openings, the cover plate disposed on the one or more guide rods above the plurality of load cells such that a portion of the plurality of conically shaped paper rolls pass through the plurality of openings and are aligned by the cover plate to come into contact with the plurality of load cells.

13. The weighing machine of claim 8, wherein the plurality of load cells are mounted on a plate disposed on the one or more guide rods on the surface in the weighing machine.

14. The weighing machine of claim 8, wherein the plurality of load cells are arranged in one or more rows.

15. A weighing machine comprising:

a plurality of load cells configured to weigh a material contained in individual paper rolls of a plurality of paper rolls;

a tray for removeably receiving the plurality of paper rolls;

one or more guide rods disposed on a surface in the weighing machine, the one or more guide rods align the plurality of paper rolls removeably received in the tray with the plurality of load cells;

a programmable logic controller configured to receive signals from the plurality of load cells and process the signals into readable data; and a display unit configured to:

receive, from a remote communication input/output unit, data representing a display layout representing readable information of a weight of the material contained in the individual paper rolls, and display the readable information of the weight of the material contained in the respective paper rolls.

16. The weighing machine of claim 15, further comprising an interconnection board configured to receive and amplify the signals, wherein the programmable logic controller receives the signals from the interconnection board.

17. The weighing machine of claim 15, wherein the one or more guide rods align the tray with the plurality of load cells such that respective bottoms of the individual paper rolls come into contact with individual load cells of the plurality of load cells.

18. The weighing machine of claim 15, further comprising:

a cover plate having a plurality of openings, the cover plate disposed on the one or more guide rods above the plurality of load cells such that a portion of the plurality of paper rolls pass through the plurality of openings and are aligned by the cover plate to come into contact with the plurality of load cells.

19. The weighing machine of claim 15, wherein the plurality of load cells are mounted on a plate disposed on the one or more guide rods on the surface in the weighing machine.

20. The weighing machine of claim 15, wherein the plurality of load cells are arranged in one or more rows.

* * * * *